US009125269B2

(12) United States Patent  (10) Patent No.: US 9,125,269 B2
Knoedgen et al.  (45) Date of Patent: Sep. 1, 2015

(54) CONTROLLERS FOR SOLID STATE LIGHT BULB ASSEMBLIES

(71) Applicant: Dialog Semiconductor GmbH, Kirchheim/Teck-Nabern (DE)

(72) Inventors: Horst Knoedgen, Munich (DE); Stefan Zudrell-Koch, Hohenems (AT)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 14/250,415

(22) Filed: Apr. 11, 2014

(65) Prior Publication Data

US 2014/0217887 A1    Aug. 7, 2014

Related U.S. Application Data

(63) Continuation of application No. PCT/EP2012/070218, filed on Oct. 11, 2012.

(60) Provisional application No. 61/546,434, filed on Oct. 12, 2011.

(51) Int. Cl.
  *H05B 37/02*  (2006.01)
  *H05B 33/08*  (2006.01)

(52) U.S. Cl.
  CPC ........ *H05B 33/0842* (2013.01); *H05B 33/0815* (2013.01); *Y02B 20/383* (2013.01)

(58) Field of Classification Search
  CPC ........... H05B 33/0815; H05B 33/0842; Y02B 20/383; G06F 1/286
  USPC ............ 315/291, 294, 224, 307, 51, 149, 152
  See application file for complete search history.

(56) References Cited

U.S. PATENT DOCUMENTS

| | | | | |
|---|---|---|---|---|
| 6,463,396 | B1 * | 10/2002 | Nishigaki | 702/132 |
| 2006/0224059 | A1 * | 10/2006 | Swedlow et al. | 600/323 |
| 2009/0040674 | A1 * | 2/2009 | Roberts et al. | 361/78 |
| 2009/0179595 | A1 * | 7/2009 | Hite et al. | 315/308 |
| 2009/0289965 | A1 * | 11/2009 | Kurokawa et al. | 345/690 |
| 2011/0219208 | A1 * | 9/2011 | Asaad et al. | 712/12 |
| 2011/0241572 | A1 * | 10/2011 | Zhang et al. | 315/308 |
| 2013/0060499 | A1 * | 3/2013 | Yoshimura | 702/99 |

* cited by examiner

*Primary Examiner* — Jimmy Vu
*Assistant Examiner* — Syed M Kaiser
(74) *Attorney, Agent, or Firm* — Saile Ackerman LLC; Stephen B. Ackerman

(57) ABSTRACT

Controllers for driver circuits of solid state light bulb assemblies including light emitting diodes comprise a power converter, a data storage unit operable to store data items relating to an operating behavior of the light bulb assembly, a temperature sensor operable to determine a chip temperature of the controller, and a data processing unit operable to receive the chip temperature, to retrieve the stored data items from the data storage unit, to generate a control signal in dependence upon the chip temperature and the retrieved data items, and to output the control signal to the power converter for operation of the light source.

15 Claims, 6 Drawing Sheets

CONTROLLERS FOR SOLID STATE LIGHT BULB ASSEMBLIES

This application is a Continuation of PCT Application no. PCT/EP2012/070218, which was filed on Oct. 11, 2012, and which is herein incorporated by reference in its entirety.

TECHNICAL FIELD

The present document relates to controllers for solid state light bulb assemblies and, in particular, for light bulb assemblies including light so emitting diodes.

BACKGROUND

There is an increasing interest in electric light bulbs which do not make use of incandescent filaments, since filament-based light bulbs are considered to be inefficient and energy hungry. Indeed, recent legislative changes mean that traditional incandescent light bulbs are being phased out in many parts of the world. One existing replacement for the incandescent light bulb is the compact fluorescent light bulb.

Solid state lighting, for example light emitting diode (LED) or organic light emitting diode (OLED) based retrofit lamps, offer superior performance over compact fluorescent lamp (CFL) based retrofit lamps in terms of efficiency, instant light output, light quality, and lifetime. The main barrier to penetrate the market is product cost, since the shop price of today's LED-based lamps can be up to 10 times that of CFL lamps.

A key element of an LED lamp assembly is the LED light source. The luminous efficiency, measured in lumen per watt, has been improved significantly over the last 10 years, and continues to increase further to levels of 250 lm/W for white light LEDs, with potential for further improvement.

Another strong advantage of using LED light sources is that they offer superior lifetime since the only failure mode is a slow depreciation of the outcoupling optics of the light source.

In order to exploit the enormous advantages of LED in terms of its luminous efficiency and its potentially superior lifetime, it is necessary to maintain the LED device strictly below its specified maximum temperature.

Although the LED offers excellent luminous efficiency over alternative light source technologies one strong disadvantage of any solid state light source is that there is no radiation of energy in the form of infrared radiation so that any power losses inside the light source component has to be propagated to the environment purely by heat conduction.

Another aspect of maintaining the LED at or below a desired temperature is that the efficiency of the device degrades with increasing temperature, thereby increasing further the device temperature, assuming the power provided by the power supply is kept at a constant level.

The fast and dynamic improvement of LED efficiency can be utilized only if the manufacturer of solid state light source (SSL) based lamp assemblies can change their product to accommodate new generations of SSL components. This requires normally a redesign of components within the power supply or driver unit inside the SSL lamp assembly due to changing requirements of the SSL. Such redesign tasks are resource and time intensive and increase heavily the total cost for the manufacturer of SSL lamp assemblies.

In order to maintain the light source device at and below a strict temperature limit requires the SSL lamp assembly to be carefully optimized with respect to its thermal performance and characteristics. The system should be designed that under all conditions, including worst case conditions, the SSL chip is maintained below its maximum specified temperature. This may require bulky cooling parts in order to ensure a low thermal resistance between the SSL chip and its surroundings. The cooling of the SSL chip is a major contribution to the product cost and can be a factor in the reluctance to accept SSL lamp assemblies by the end user.

One technique used in previously-considered power supply circuits for SSL lamp assemblies is to use control integrated circuits (ICs) which operate a specific power electronics architecture at an operating point which is set by a combination of references inside the control IC, the values of external components, the actual condition of the input power as well as the electrical characteristics of the SSL device. All these factors produce a statistical variance across of power delivered to the SSL device over a range of manufactured SSL lamp assemblies. The outer limits of the distribution of power dissipated within the SSL device as well as the variance of the ambient temperature in which the lamp assembly is to be operated defines the requirements for the worst case thermal conditions for which the system has to be operated such that all components are within the safe operating area that guarantees the rated system lifetime.

Lamp assemblies have to comply with safety requirements which require the system to stay within temperature limits. In order to guarantee safety limitations as well as to guarantee lifetime specifications state of the art control ICs for SSL driver units offer a temperature shutdown function which turns the system off whenever a specific threshold is reached at a temperature sensor. The shutdown threshold is at a fixed temperature range between maximum and minimum values which result out of manufacturing tolerances.

In previously-considered solutions, the system remains in shutdown mode once the over temperature condition was met at one time.

In order to avoid any irregular shutdown, or, in case there is no thermal shutdown, in order to maintain a certain temperature maximum at any time in any rated operating condition, the thermal design of a SSL lamp assembly must foresee a temperature headroom. This causes additional substantial material cost which is not effective in most cases because the statistical limits are not met in most cases.

In previously-considered control ICs for SSL lamp assembly power supply circuits the optimization of the thermal subsystem is strongly limited by the large variance in electrical thermal and optical parameters and requires the implementation of redundancy in the cooling system.

It is desirable to provide a controller and driver circuit that is able to adapt the power delivered to an SSL component in order to maintain the maximum temperature of the SSL component at or below a specified level. Such a design can serve to reduce the reserve which is needed in the thermal design for worst case conditions, thereby reducing the cost of the cooling system of the SSL lamp assembly.

It is also desirable to provide a controller, driver circuit and SSL lamp assembly that can serve to reduce the cost of adapting lamp assemblies to feature new SSL components.

SUMMARY

According to an aspect, a controller for a driver circuit of a solid state light bulb assembly is described. The solid state light bulb assembly comprises a light source, e.g. a solid state light source such as an LED or OLED. The driver circuit typically comprises a power converter which is configured to convert electrical power from a mains supply to electrical power for the light source. In particular, the power converter may be configured to convert a DC input voltage into a DC output voltage, wherein the DC output voltage typically corresponds to the on-voltage of the SSL source.

The controller may comprise a data storage unit (e.g. a digital data storage unit) which is operable to store data items relating to an operating behavior of the light bulb assembly. By way of example the data items may comprise data items which define a state machine describing the operating behavior of the light source of the light bulb assembly. Alternatively or in addition, the data items may comprise a thermal model of the light bulb assembly, wherein the thermal model describes a relationship between a temperature of the light source and a chip temperature measured at the controller.

Furthermore, the controller may comprise a temperature sensor operable to determine the chip temperature of the controller. The chip temperature may be regarded as temperature information relating to the light bulb assembly. In particular, the chip temperature may be indicative of the temperature of the light source. The controller may comprise an analog-to-digital converter operable to convert an analog signal of the temperature sensor into a digital chip temperature, which may be processed by a digital data processing unit of the controller.

The controller may comprise a data processing unit (e.g. a digital data processing unit) operable to receive the chip temperature, and/or to retrieve the stored data items from the data storage unit, and/or to generate a control signal in dependence upon the chip temperature and the retrieved data items, and/or to output the control signal to the power converter for operation of the light source. The control signal may e.g. by a pulse width modulated signal which controls a duty cycle and/or a commutation cycle rate of the power converter, thereby controlling a conversion ratio between the input voltage and the output voltage of the power converter.

The data processing unit may comprise a state control unit which is configured to control a state of the light bulb assembly (or the light source). The light bulb assembly (or the light source) may be operated in a plurality of different states, wherein the plurality of states is indicative of a plurality of corresponding different illumination levels of the light source. The data items stored in the data storage unit may comprise (or may define) a state machine. The state machine may comprise (or may define) the plurality of states indicative of the plurality of corresponding illumination levels of the light source, and a plurality of transitions between at least some of the plurality of states. The plurality of transitions is typically subjected to a respective plurality of events. In other words, a transition from a first state to a second state is typically triggered by the detection of a particular event. An event of the plurality of events may be defined by one or more conditions. The one or more conditions may comprise one or more of: a condition with respect to the chip temperature, a condition with respect to a pre-determined time interval, and/or a condition with respect to a mains supply voltage.

The state control unit may be operable to determine a current state of the plurality of states. The current state is typically the state that the light source is currently operated in. By way of example, the current state may be indicative of the current illumination level of the light source. For this purpose, a state may comprise information regarding the amount of power which is supplied to the light source. The amount of power supplied to the light source may be indicative for the illumination level of the light source. The light bulb assembly specific relationship between the amount of supplied power and the actual illumination level may be determined in the context of an illumination calibration during the manufacturing process of the light bulb assembly.

The state control unit may be operable to detect an event based on the chip temperature. The event may be defined e.g. by the condition that the chip temperature exceeds or lies below a pre-determined temperature threshold. Furthermore, the state control unit may be operable to determine a target state of the plurality of states based on the state machine. By way of example, the state machine may be indicative of an event-dependent transition from the current state to the target state. The data processing unit may be operable to generate the control signal for operating the light source in accordance to the target state.

As indicative above, a state of the plurality of states may be indicative of a power to be provided by the power converter to the light source. The control signal for the target state may be configured to operate the power converter such that the amount of power provided by the power converter to the light source corresponds to the target state. A state of the plurality of states may be associated with settings of the power converter. The settings may comprise one or more of: a duty cycle and a commutation cycle rate.

The state machine may be used to select a state of the light bulb assembly in dependence of the measured chip temperature (which typically is indicative of the temperature of the light source). In particular, the state machine may be used to put the light source into a target state (with a reduced illumination level), if it is determined that the chip temperature exceeds a pre-determined threshold. By doing this, the light source can be protected from overheating.

The state machine may provide a hysteresis for the transition between states, such that a transition from a first state indicative of a first illumination level to a second state indicative of a second illumination level occurs subject to a first event comprising a condition that the chip temperature exceeds a second threshold. The second illumination level may be lower than the first illumination level. Furthermore, the state machine may specify that a transition from the second state to the first state occurs subject to a second event comprising a condition that the chip temperature is below a first threshold. The first threshold may be lower than the second threshold. The use of a hysteresis may increase the stability of the light bulb assembly, in particular the stability of the light emitted by the light bulb assembly.

The state machine, the plurality of states and/or the plurality of events may depend on an operational phase of the light bulb assembly. By doing this, it may be taken into account that the actual illumination level of the light source may depend on the temperature of the light source. The operational phase may comprise one or more of: a start-up phase and/or a steady phase at a particular illumination level. The start-up may be associated with a ramp-up of the temperature of the light source, thereby leading to a ramp-up of the illumination level. The state machine may be designed such that the temperature dependent ramp-up of the illumination level is compensated, thereby leading to a steady illumination of the light source, even during ramp-up. The temperature of the light source during the steady phase may depend on the illumination level (i.e. on the current state) of the light source. By way of example, for each current state, a different state machine may be defined, thereby taking into account the current temperature of the light source.

The data processing unit may comprise a calibration unit configured to calibrate the light bulb assembly (e.g. during a manufacturing phase or during an initialization phase). The data items may comprise a default thermal model indicative of a relationship between the chip temperature and a temperature of the light source. The thermal model may comprise a plurality of parameters which are indicative of the thermal conductivity and/or the thermal storage capacity of components of the light bulb assembly. The calibration unit may be operable to determine light bulb assembly specific parameters of the default thermal model during a calibration or initialization phase, thereby yielding a light bulb assembly specific thermal model. The light bulb assembly specific thermal model may be used to determine an estimate of the temperature of the light source based on the measured chip temperature.

The data processing unit may be operable to determine a light bulb assembly specific state machine for the operation of the light bulb assembly, based on the light bulb assembly specific thermal model. As indicative above, the state machine may be used to protect the light source from overheating. In order to provide for a reliable overheating protection, there should be a reliable relationship between the measured chip temperature and the actual temperature of the light source. The light bulb assembly specific thermal model may be used to provide such a reliable relationship which is used for the definition of the state machine.

The data processing unit may be operable to determine a plurality of light bulb assembly specific state machines for a corresponding plurality of operational phases of the light bulb assembly. This is due to the fact that (possibly in addition to the temperature dependent illumination levels) the thermal model may be dependent on the temperature of the light bulb assembly. As such, different thermal models may be used to define different state machines for different operational phases of the light bulb assembly.

The calibration unit may be operable to determine a temporal evolution of the chip temperature, subject to a default state of the light source. By way of example, the light source may be set to a pre-determined illumination level. The calibration unit may be configured to determine the ramp-up of the chip temperature in response to setting the light source to the pre-determined illumination level. Furthermore, the calibration unit may be operable to determine the light bulb assembly specific parameters of the default thermal model based on the determined temporal evolution of the chip temperature.

Alternatively or in addition, the data processing unit may be operable to compare the temporal evolution of the chip temperature with a default temporal evolution of the light bulb assembly. This comparing may be performed e.g. during normal operation of the light bulb assembly (e.g. during the start-up phase when switching on the light bulb assembly). The data processing unit may be configured to generate a control signal for operating the light source in a safe operation mode with reduced illumination level, if a deviation between the temporal evolution and the default temporal evolution exceeds a pre-determined deviation threshold. A deviation of the measured temporal evolution and the default temporal evolution may be indicative of a mechanical defect within the light bulb assembly.

As indicated above, the data processing unit may be operable to determine an estimate of the temperature of the light source based on the chip temperature and based on the light bulb assembly specific thermal model. The light bulb assembly specific thermal model may be dependent on the operational phase of the light bulb assembly. Alternatively or in addition, the data processing unit may be operable to determine the estimate of the temperature of the light source based on a current through the light source (e.g. based on the drive current) and/or based on a voltage at the light source (e.g. based on the output voltage of the power converter of the driver circuit).

According to another aspect, a driver circuit for a solid state light bulb assembly is described. The driver circuit may comprise a power converter operable to output a drive signal (e.g. a drive voltage and/or a drive current) to a solid state light source in dependence upon a received control signal. Furthermore, the driver circuit may comprise a controller according to any of the aspects described in the present document. The controller may be operable to provide the control signal for the power converter.

According to a further aspect, a light bulb assembly is described. The light bulb assembly may comprise a housing, a solid state light emitting device located within the housing and an electrical connection module attached to the housing and adapted for connection to a mains supply. Furthermore, the light bulb assembly may comprise a driver circuit according to any of the aspects described in the present document. The driver circuit may be located within the housing, and may be connected to receive an electricity supply signal from the electrical connection module. Furthermore, the driver circuit may be operable to supply an electrical drive signal to the light emitting device.

According to a further aspect, there is provided a controller for a driver circuit of a solid state light bulb assembly, the controller comprising a digital data storage unit operable to store data items relating to operating behavior of a light bulb assembly, and a digital data processing unit operable to receive temperature information relating to a light bulb assembly under control, to retrieve stored data items from the data storage unit, to generate a control signal in dependence upon such received temperature information and retrieved data items, and to output such a control signal.

According to another aspect, there is provided a driver circuit for a solid state light bulb assembly, the driver comprising a power converter operable to output a drive signal in dependence upon a received control signal, and a controller operable to provide a control signal to the power converter, wherein the controller comprises a digital data storage unit operable to store data items relating to operating behaviour of a light bulb assembly, and a digital data processing unit operable to receive temperature information relating to a light bulb assembly under control, to retrieve stored data items from the data storage unit, to generate a control signal in dependence upon such received temperature information and retrieved data items, and to output such a control signal.

According to another aspect, there is provided a light bulb assembly comprising a housing, a solid state light emitting device, located within the housing, an electrical connection module, attached to the housing, and adapted for connection to an electricity supply, a temperature sensor operable to output a sensor signal indicative of an operating temperature of a component of the assembly, and a driver circuit located within the housing, connected to receive an electricity supply signal from the electrical connection module, operable to supply an electrical drive signal to the light emitting device, and comprising a power converter operable to output a drive signal in dependence upon a received control signal, and a controller operable to provide a control signal to the power converter, wherein the controller comprises a digital data storage unit operable to store data items relating to operating behavior of a light bulb assembly, and a digital data processing unit operable to receive temperature information relating to a light bulb assembly under control, to retrieve stored data items from the data storage unit, to generate a control signal in dependence upon such received temperature information and retrieved data items, and to output such a control signal.

In one example, the control signal is indicative of a desired output level (also referred to as illumination level) of a light emitting device in such a light bulb assembly. In one example, the data processing unit is operable to generate a control signal which serves to control a pulse width modulation of a switch in a power converter of such a light bulb assembly.

One example further comprises an integrated temperature sensor operable to provide the temperature information (e.g. the chip temperature) to the digital data processing unit. In one example, the digital data processing unit is operable to generate the control signal by reference to a look-up table stored in the digital data storage device. The look-up table may be used to relate the parameters of the power converter (or the amount of power provided by the power converter) with the illumination state of the light source. As such, the look-up table may be used in conjunction with the state machine, in order to define the transition between different illumination states of the light source.

In one example, the data processing unit is operable to generate a control signal which serves to cause at least one of: a reduction of output power from a light emitting device, a reduction of output power to substantially zero from a light emitting device, inactivity of a light emitting device for a predefined period of time, and generation of an indicator signal to a user through control of a light emitting device. In one example, the data processing unit is operable to generate such a control signal to reduce the light output level from the light emitting device when the sensor signal indicates a temperature above a predetermined threshold level. In one example, the data processing unit is operable to generate such a control signal to reduce the light output level from the light emitting device substantially to zero when the sensor signal indicates a temperature above a predetermined threshold level. In one example, the data processing unit is operable to generate such a control signal to reduce the light output level from the light emitting device in a linear fashion when the sensor signal indicates a temperature above a predetermined threshold level.

In one example, the data processing unit is operable to generate such a control signal to maintain the light output level from the light emitting device substantially at a predetermined level. In one example, the data processing unit is operable to generate such a control signal to maintain the light output level from the light emitting device within a predetermined range of output levels. In one example, the data processing unit is operable to generate such a control signal to cause the light output level from the light emitting device to provide an indicator signal to a user. In one example, the data processing unit is operable to receive the temperature information in the form of a digital value having a resolution of at least two bits. In one example, the data processing unit is operable to receive temporal information, and is operable to generate the control signal in additional dependence upon such received temporal information. In an example, the system comprises at least one thermal sensor. The at least one sensor can be either implemented as part of the control IC chip or as a discrete thermal sensor component. Further to that, instead of or in addition to using a thermal sensor the relevant system temperature can be derived out of any characterizing parameter of one of the involved components. For example, the voltage and current setting of a particular assembly can be used as an indicator for the LED temperature. In such an example, the system may further comprise an A/D converter which converts the sensed thermal quantity into a digital representation. The A/D converter may have a digital resolution of at least 2 bits.

In an example, the system may further comprise a nonvolatile memory device (e.g. the data storage unit). The device can be implemented as FLASH memory, as OTP memory or as wired ROM memory or in any other technology for non-volatile data storage. In one example, the memory device is implemented as an integral part of the driver IC chip. The memory content can be programmed into the memory device at the stage of chip test and calibration, at the insertion of the IC into the power converter module, at test of the power converter module or after full assembly of the SSL lamp assembly.

In an example, the system may further comprise a power converter which has a control information input that sets the amount of electrical power which is delivered to the SSL device. In one example, this control information is a vector of PWM signals which control the power switches inside the power converter module. In an example, the system may further comprise a digital controller which generates the said control information such that the power quantity delivered to the SSL device is dependent upon the received digital thermal information and behavioral information stored in the memory device. In an example, the system may further comprise a system clock capable of generating timing information.

In one example, the digital controller implements system states whereas the transition between states is conditional to the measured temperature level and reference information inside the memory device. The transition between states can further be dependent on time information generated by the system clock and time reference information stored in the memory device. The transition between states can be further dependent on on/off events at the mains supply input.

In each of the system states a particular power level may be delivered to the SSL device. By choosing appropriate values for the power delivered to the SSL device the SSL lamp assembly can be designed such that the SSL chip temperature stays below a certain maximum limit under all conditions hence reducing the overhead needed to ensure the temperature limit by design of components. By setting the temperature level dependent upon tolerance information inside the assembled SSL lamp the accuracy of the sensed temperature condition can be greatly improved, further reducing the required safety margin for the thermal design of the SSL lamp assembly.

In one example, the said system states as well as the transitions between states are programmed into the memory device. The digital controller is further characterized in that the memory content is read and all relevant system parameters are set according to information stored inside the memory device and that the operating states are implemented according to information inside the memory device.

The disclosed system is capable of implementing a particular thermal profile (e.g. the thermal model of the light bulb assembly) or characteristic that enables minimization of the overhead needed as safety margin for the thermal design of the SSL lamp assembly.

The digital controller may be implemented as hardwired logic, as gate array, as FPGA or may include a microcontroller.

In one example, the system implements only one state and sets the power delivered to the SSL device according to the at least one sensed thermal information and behavioral information stored inside the memory device. In one example the behavioral information can be a lookup table. In one example the behavioral information can be gain information to set the power delivered to the SSL device as an analytical function (e.g. provided by the thermal model) of the thermal information received from the at least one thermal sensor.

DETAILED DESCRIPTION

In the current context a light bulb "assembly" includes all of the components required to replace a traditional incandescent filament-based light bulb. As will become clear from the description of the examples given below, the aspects of the present document are applicable to light bulb assemblies for connection to the standard electricity supply. In British English, this electricity supply is known as "mains" electricity. Whilst in US English, this supply is known as power line. Other terms include AC power, line power, domestic power and grid power. It is to be understood that these terms are readily interchangeable, and carry the same meaning.

Typically, in Europe electricity is supplied at 230-240 VAC, at 50 Hz and in North America at 110-120 VAC at 60 Hz. The principles set out below apply to any suitable electricity supply, including the mains/power line mentioned, a DC power supply, and a rectified AC power supply.

Figure 1:
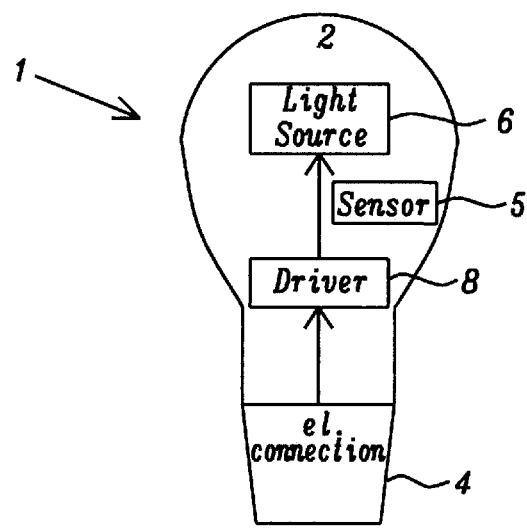
FIG. 1 is a schematic view of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. A solid state light source (SSL) 6, for example a light emitting diode (LED) or organic light emitting diode (OLED), is provided within the housing 2. The light source 6 may be provided by a single light emitting device, or by a plurality of such devices.

Drive circuitry 8 is located within the bulb housing 2, and serves to convert supply electricity received through the electrical connection module 4 into a controlled drive current for the solid state light source 6. At least one temperature sensor 5 is provided within the assembly in order to provide at least one temperature measurement signal indicative of a temperature of the light emitting device or another component of the assembly. The temperature sensor may be provided by a discrete component, or may be provided within one or more of the other components, such as the power converter or the controller, in the assembly.

The housing 2 provides a suitably robust enclosure for the light source and drive components, and includes an optical elements that a required for providing the desired output light from the assembly. The housing 2 also provides a heat-sink capability, since management of the temperature of the light source is important in maximizing light output and light source life. Accordingly, the housing is designed to enable heat generated by the light source to be conducted away from the light source, and out of the assembly as a whole. One complication of the housing design is that, for consumer products, the outer temperature of the housing must be suitably low to prevent injury to a user. These requirements can lead to housing designs that are complex to manufacture. Accordingly, careful and accurate management of the thermal characteristics of the light bulb is, therefore, desirable.

The provision of a temperature sensor within the assembly allows control of the power converter such that the temperature of the light emitting device is controlled. This control may be by virtue of direct measurement of the temperature of the light emitting device, or by indirect measurement thereof.

Figure 2:
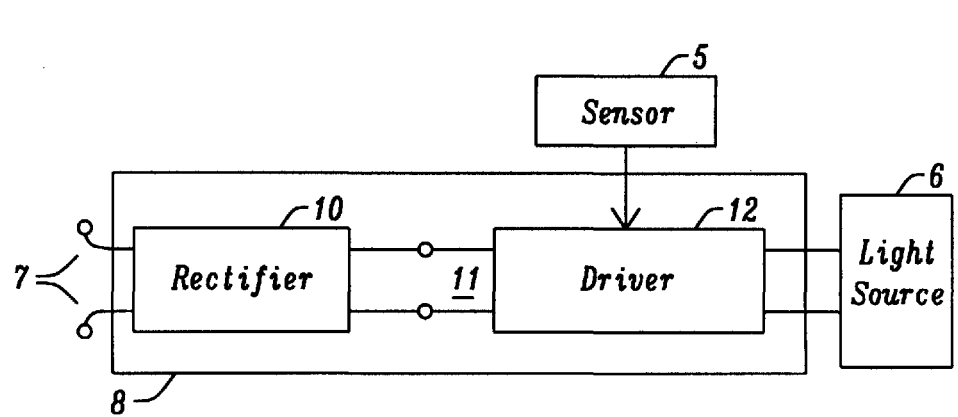
FIG. 2 is a schematic block diagram of example drive circuitry of the assembly of FIG. 1.

FIG. 2 illustrates the temperature sensor 5, light source 6 and drive circuitry 8 of FIG. 1 in more detail. The drive circuitry 8 comprises a rectifier 10 which receives alternating current (AC) supply electricity, and delivers a rectified current (DC) 11 at its output. This DC power is received by a driver 12 which serves to output a controlled DC drive signal to provide electrical power to the light source 6. The voltage and current characteristics of the output drive signal from the driver 12 are determined by the type and number of light emitting devices employed in the light source 6. The power supplied to the light source 6 is controlled in dependence upon desired operating conditions of the light source 6. In one example, the light source includes a plurality of light emitting devices, and requires a drive signal having a voltage of 50V or more. In general, the drive signal (in particular the drive voltage corresponding to the on-voltage of the SSL source) may be in the range of 10V to over 100V.

Figure 3:
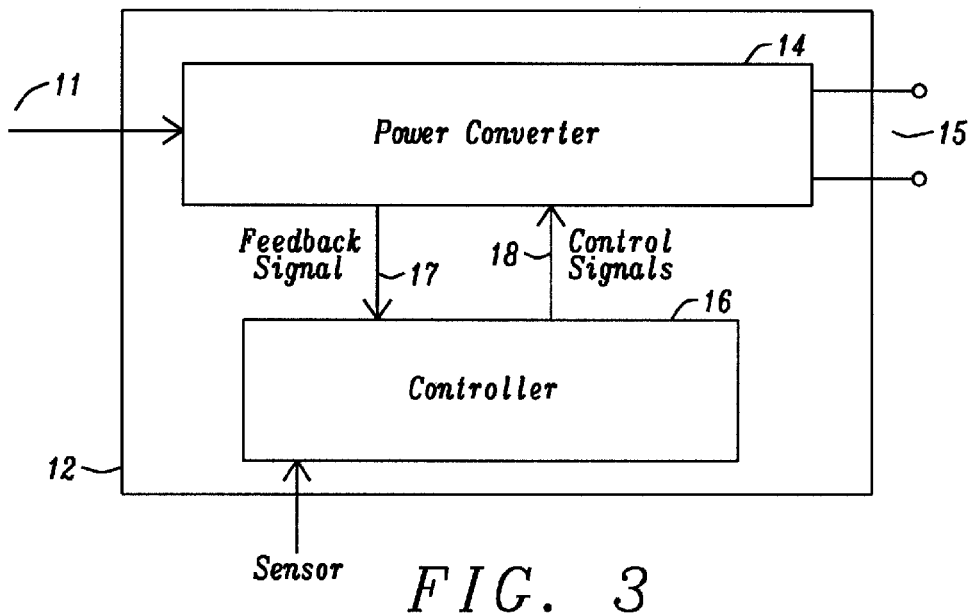
FIG. 3 is a schematic block diagram of a first example driver for use in the circuitry of FIG. 2.

FIG. 3 illustrates an example driver 12 suitable for use in the drive circuitry 8 of FIG. 2. The driver 12 includes a power converter 14, and a controller 16. The power converter 14 receives DC power 11 from the rectifier 10, and operates to output a controlled drive signal 15 to the light source 6. The controller 16 receives the temperature sensor signal from the temperature sensor 5. The controller 16 may also receive additional sensor or feedback signals 17 relating to the operation of the power converter 14 and/or to the operation of the light source 6. The controller 16 provides control signals 18 to the power converter 14 in order that the drive signal 15 is appropriate to the desired operation of the light source 6. It will be appreciated that the DC power may be provided by rectified AC power supplied to the light bulb assembly, or by a DC power source such as a battery.

In the case where the light source 6 includes a plurality of light emitting devices, those devices may be controlled by a single drive signal, or may be controlled by individual drive signals representing different control channels. Alternatively, the devices may be controlled in predetermined groups, each having a control signal or channel. One example of multiple channel control is when the light source produces white light using red, green and blue devices (RGB devices). Separate control channels enable the colour spectrum of the white output light to be tuned. Such control is also applicable to the case when devices having different white color temperatures are used.

The power converter 14 comprises at least one inductive energy storage device, and at least one switch device. The switch device is controlled by the controller 16, and may be provided by a metal oxide semiconductor field effect transistor (MOSFET) device, or other device suitable for switching high voltage (for example, up to hundreds of volts). The power converter can be provided by any suitable circuit topology. For example, a buck converter circuit, a boost converter circuit, a buck/boost converter circuit, a SEPIC (single-ended primary-inductor converter) circuit, or a flyback converter circuit could be used for the power converter 14. The power converter may be a single stage circuit, a two-stage circuit or a multistage circuit.

Figure 4:
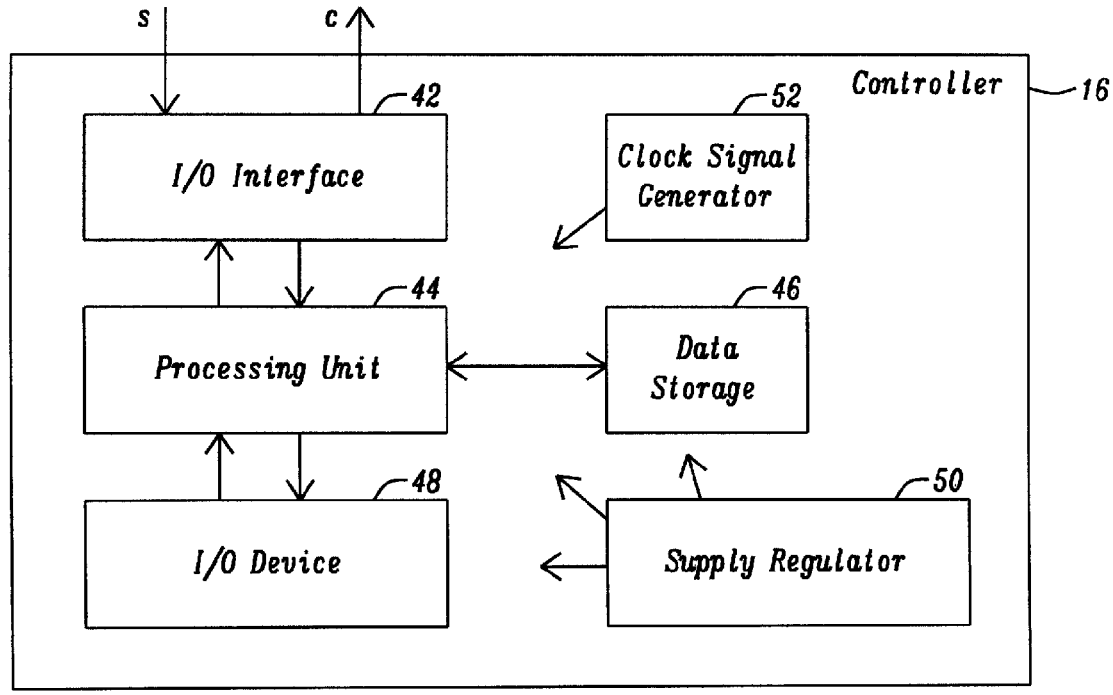
FIG. 4 is a schematic block diagram of an example controller for use in the driver of FIG. 3.

FIG. 4 illustrates an example of a controller 16 suitable for use in the driver of FIG. 3. The controller 16 includes input/ output interface unit 42 for receiving the temperature sensor signal and possible additional sensor/feedback signals S (e.g. the signal 17 of FIG. 3) and for outputting control signals C (e.g. the signal 18 of FIG. 3), a processing unit 44 for overall control of the system, and a data storage unit 46 for storing data for use by the processing unit 44. A communications input/output unit 48 may be provided for enabling the processing unit 44 to communicate with other light bulb assemblies or controllers, for example using a suitable wired or wireless communications protocol. The controller 16 also incorporates a power supply regulator 50, which supplies power to the units within the controller 16, and a clock signal generator 52 (such as an oscillator circuit) for supplying a reference clock signal to the processing unit 44.

The input/output interface unit 42 may include an analogue to digital converter for providing digital information to the processing unit 44. The interface unit 42 may also operate to deliver timing information relating to at least one of input signals.

By way of example, the processing unit 44 may be programmable by virtue of the provision of the data storage unit 46. The data storage unit may be provided by a fuse array, a one-time programmable device, a flash memory device, or any other non-volatile memory device. The device may be reprogrammable, or may be programmable once during manufacture of the controller, driver or light bulb assembly. Storing data in the data storage unit 46 enables the functionality of the processing unit 44 to change in dependence with the operating characteristics of the power converter 14 and/or light emitting device 6, and allows a single driver circuit to be used with a range of different light bulb assemblies.

The processing unit 44 operates to generate the control signals C for controlling the switch device or devices in the power converter 14. Typically, the control signals will be pulse width modulated signals that control the duty cycle (that is, the ratio of 'on' to 'off') of the switch device in the power converter 14, and hence control the output drive signal 15. The processing unit 44 combines the received temperature sensor signal relating to an operating temperature of a component of the assembly with behavior information stored as data in the data storage unit 46.

The processing unit 44 operates to control the drive signal 15 supplied to the light source 6 in dependence upon the temperature sensor signal, in accordance with desired behaviors defined by the stored behaviour data. The processing unit 44 operates to move the light source and/or power converter from one operating state (e.g. illumination state) to another in dependence upon the temperature sensor signal (e.g. the chip temperature).

For example, if the temperature sensor signal indicates that the operating temperature of the light source is reaching an unacceptable level, then the drive signal can be adjusted so that the source device runs at a predefined, possibly reduced, power level, so as to reduce its temperature. Such reduced temperature running of the light source may be performed in order to prolong the working life of the light source, for example. Alternatively, the light source may be shut off altogether in order to avoid damage, and may then be turned back on after a predetermined time period, or following a reduction in temperature to within acceptable operating limits. In one example, the controller operates to cause an indicator signal to be output by the light source to the user. Such an indicator may be in the form of a flashing light signal, or other appropriate indicator.

The processing unit 44 is operable to generate the control signal in dependence upon the temperature measurement signal in any suitable manner. In one example, the processing unit 44 is operable to access a look-up table stored in the data storage unit 46. The look-up table includes information that converts a temperature measurement to a desired power level, so that the control signal can be generated accordingly. In another example, the processing unit calculates the appropriate power level, and hence control signal, using an algorithmic approach. Such an approach can be implemented using hardware, software or a combination of the two. One example control scheme controls the output power of the light source in a linear manner dependent upon the temperature measurement signal.

The temperature sensor information and behaviour data may also be combined with other sensor information, such as voltage, current and desired output power information. In addition, or alternatively, the temperature information may be combined with temporal information relating to the timing of temperature events. The temperature information may be provided to the data processing unit in any appropriate form, for example in the form of a digital signal having a resolution of at least 2 bits.

Figure 5:
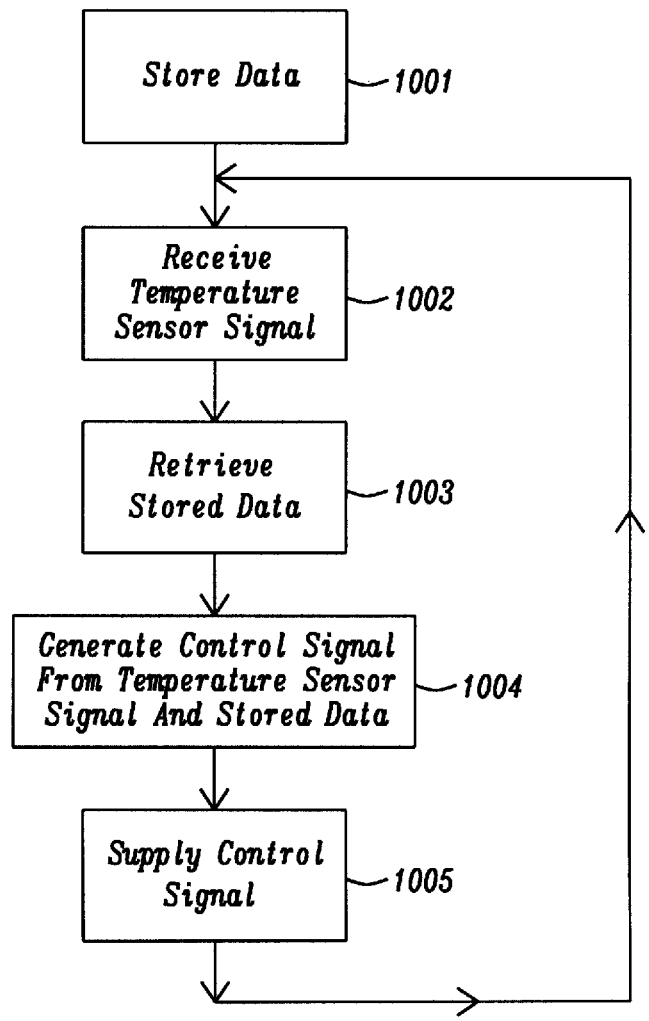
FIG. 5 is a flowchart illustrating steps in an example method for providing a temperature dependent control of a light bulb assembly.

FIG. 5 illustrates steps in an example method for controlling a light bulb assembly subject to temperature information. The method commences at step 1001 when the appropriate behavior data are stored in the data storage unit for reference later. As mentioned above, these data may be stored during manufacture of the controller, the driver or the light bulb assembly, or may be stored and/or updated at a later time. At step 1002 the temperature sensor signal is received, and then the controller retrieves the relevant behavior data stored in the data storage device (step 1003). The controller generates a control signal from the temperature sensor signal and the stored data (step 1004). The control signal is then output to the power converter for control of the switching device therein (step 1005).

By making use of a programmable controller, a driver is able to be used with a variety of different combinations of power converter stages, such as buck-buck/boost, SEPIC-SEPIC, SEPIC-flyback, flyback-buck/boost, or flyback-SEPIC, simply by making use of different stored data in the data storage device. The stored data determines the behavior of the power converter stages, and so can be tailored for the specific stages that are used in any given light bulb assembly.

In one example, the controller is implemented on a single integrated circuit, for example using a CMOS (complementary metal oxide semiconductor) sub 0.35 um process. The processing unit 44 may be provided by a logic array, a field programmable gate array, a microcontroller, or any suitable combination of elements.

It will be appreciated that the term "solid state light source" includes light emitting diodes (LEDs), organic light emitting diodes (OLEDs), and any other appropriate solid state device. Such light sources may generate any desired spectrum of output light.

As outlined above, the controller (as well as the corresponding method) aims at monitoring and controlling the temperature inside an LED retrofit lamp (i.e. inside a light bulb assembly 1). Flexibility in thermal control of the light bulb assembly 1 enables the use of less expensive LEDs (i.e. light sources 6), the use of less cooling (e.g. provided by the heat-sink capability of the housing 2 of the light bulb assembly 1), a faster time-to-market, and an increased life span for the light bulb assembly 1. The above mentioned aspects are important for a large scale deployment of LED fighting and the reduction of energy consumption.

The proposed solution makes use of digital logic and digital signal processing techniques to enable a flexible, easy and accurate thermal management in low cost LED retrofit lamp systems 1.

Figure 6:
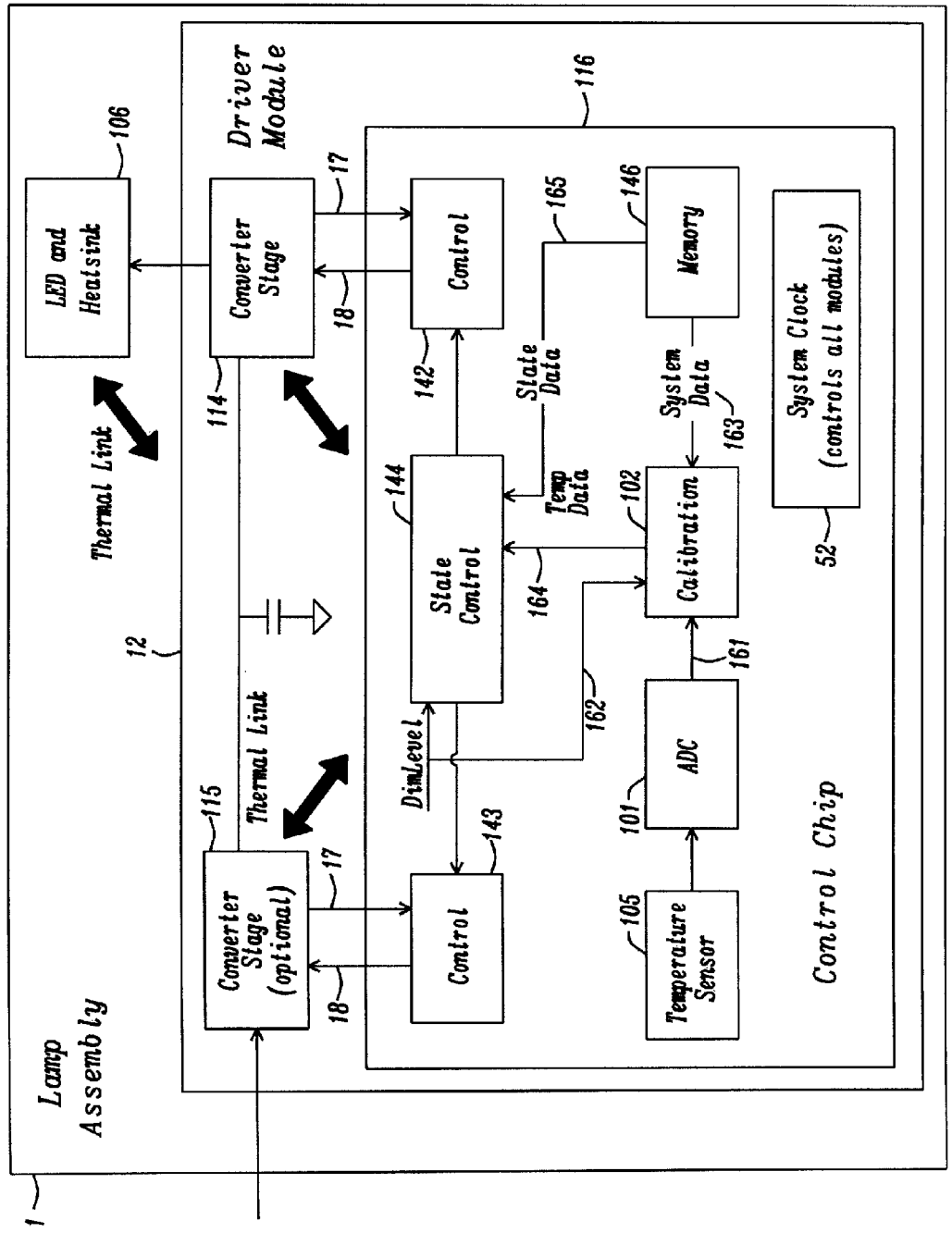
FIG. 6 illustrates an example block diagram of a light bulb assembly.

FIG. 6 illustrates an example light bulb assembly 1. The assembly 1 comprises an on-chip temperature sensor 105 (e.g. the temperature sensor 5 of FIG. 1) and an A/D (analog to digital) conversion unit 101 which converts the analog output signal from the temperature sensor 105 into a digital temperature signal 161. The digital temperature signal 161 may indicate the temperature in a resolution of at least 2 bits. The temperature provided by the on-chip temperature sensor 105 is referred to as chip temperature in the present document.

The digital temperature signal (or chip temperature) 161 may be processed inside the calibration unit 102. The calibration unit 102 may further receive system data 163 (also referred to as data items) stored in the memory unit 146 (e.g. the data storage unit 46 of FIG. 4). The memory unit 146 may comprise a One-Time-Programmable Non Volatile Memory (OTP NVP). The system data 163 may vary depending on the overall system states, i.e. depending on the state of the light bulb assembly 1. By way of example, the system data 163 may be different during start-up of the light bulb assembly 1 than during normal operation of the light bulb assembly 1. The calibration unit 102 may further receive information about the current dimlevel or illumination level 162 of the light source 106 (e.g. the light source 6 in FIG. 1). Alternatively or in addition, the calibration unit 102 may receive data 162 which is representative of the power which is currently processed in the converter stages 114, 115. By way of example, the data 162 may comprise settings of the power converter stages 114, 115 (such as conversion ratios, duty cycles, commutation cycle rates, etc.). As such, the data 162 may be indicative of the illumination state (or level) of the light source 106.

The power converter 114, 115 may be a single stage power converter or a multi stage power converter (as illustrated in FIG. 6). The first stage 115 may comprise a buck, boost, flyback, SEPIC, resonant or any other switch mode converter topology. The first stage 115 is optional and may be omitted (e.g. if a high power factor or conversion ratio is not required). The second converter stage 114 may comprise any converter type, especially power converter comprising isolating topologies.

The calibration unit 102 may be configured to generate temperature data based on data representing the physical properties of the thermal system of LED lamp assemblies. In particular, the calibration unit 102 may be configured to determine an estimate of the temperature of the LED comprised within the light source and heatsink module 106, based on the temperature signal 161 provided by the temperature sensor 105. For this purpose, the calibration unit 102 may take into account system data 163 which models a thermal transfer function of the light bulb assembly 1 (e.g. a thermal model of the light bulb assembly 1). As indicated above, the thermal transfer function may vary in dependence on the state or phase of the light bulb assembly 1 (e.g. startup phase, operation phase, dim level of the LED). Furthermore, the calibration unit 102 may take into consideration data 162 which are indicative of the dim level of the LED (referred to herein as dim level data 162). The data 162 may be derived from the settings of the power converter 114, 115 (used e.g. by the power converter controllers 143, 142). The dim level data 162 (also referred to illumination state data 162) may be used to select the appropriate system data 163 (e.g. to select the appropriate thermal transfer function).

Furthermore, the light bulb assembly 1 (in particular the controller 116, which may correspond to the controller 16 of FIG. 4) may comprise a state control unit 144. The state control unit 144 may receive temperature information 161, 164 and system state data 165 from the memory unit 146. The system state data 165 may describe a state machine for the light bulb assembly 1. Each state of the state machine may be associated with (e.g. characterized by) temperature events to which the state is sensitive. Furthermore, the state machine may be associated with (e.g. characterized by) a subsequent state which is entered upon occurrence of the respective event.

In other words, the state machine may comprise a plurality of states which may indicate respective pre-determined dim levels. In particular, a state of the plurality of states may be indicative of one or more settings for the power converter 114, 115 (which are associated with a respective dim level of the LED). In yet other words, the state may be indicative of the power which is provided to the LED (which is associated with a respective dim level of the LED). Furthermore, the state machine may define one or more events which may trigger a transition between different states of the state machine. By way of example, a particular value of the estimate of the temperature of the LED may lead to a transition between different states. Possible events are e.g.: the crossing of temperature thresholds, timeout events, and user generated events, events detected at the input mains voltage (i.e. at the mains supply) such as a particular phase-cut angle of the input mains voltage.

Figure 7A:
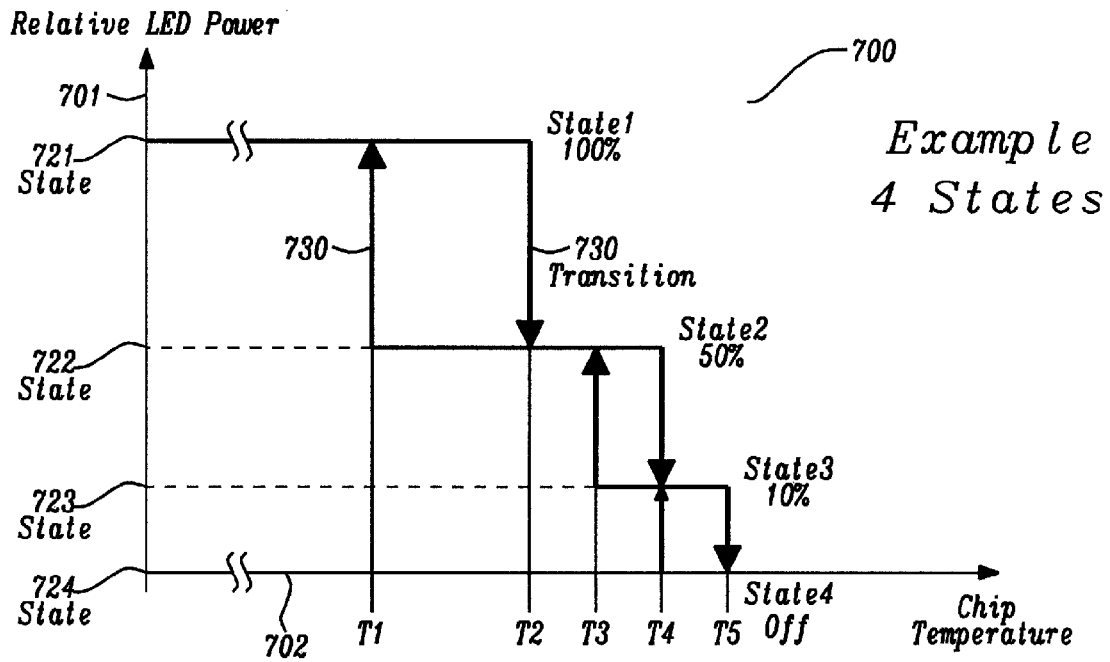
FIGS. 7a and 7b show example state machines which may be used to control the light bulb assembly in a temperature dependent manner.
Figure 7B:
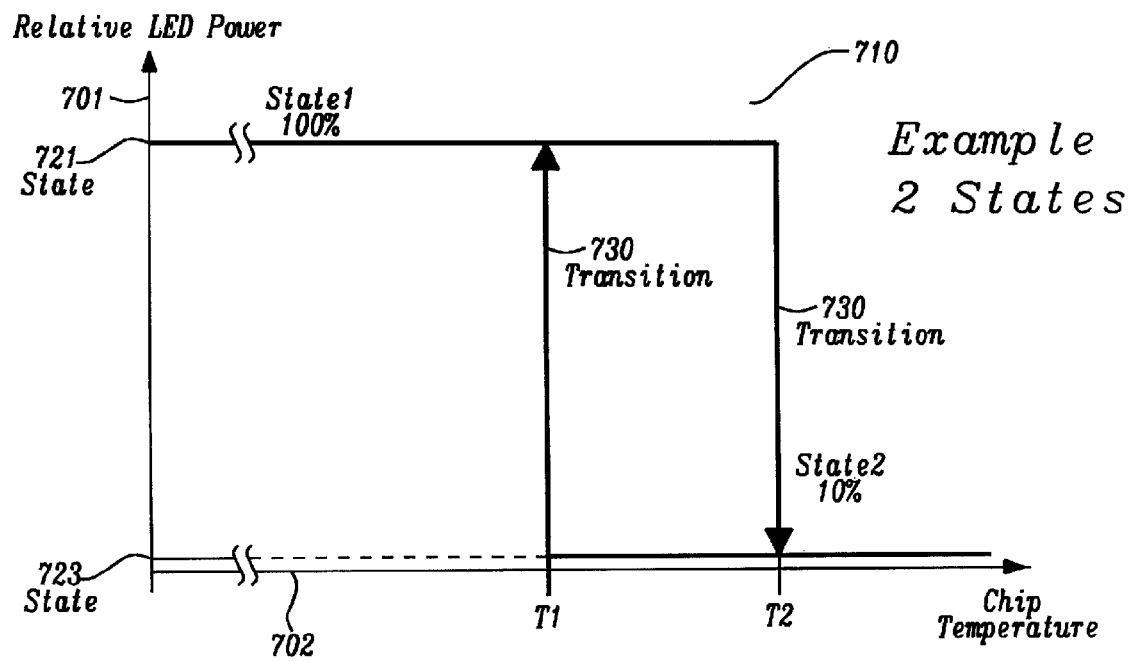

FIGS. 7a and 7b illustrate possible configurations of a state machine using multiple states and temperature crossing events. Each state has an assigned illumination state. In other word, each state is associated with a corresponding illumination level of the LED 6, 106. FIG. 7a illustrates a state machine 700 comprising four states 721, 722, 723 and 724. The first state 721 is associated with a maximum (e.g. 100%) illumination level of the LED, the second state 722 is associated with an intermediate (e.g. 50%) illumination level of the LED, the third state 723 is associated with a further intermediate (e.g. 10%) illumination level of the LED, and the fourth state 724 is associated with a minimum (e.g. 0%) illumination level of the LED (e.g. "off"). Each state 721, 722, 723, 724 may be defined by respective LED power values 701.

Furthermore, the state machine 700 comprises a plurality of events. The events may be defined by one or more conditions, e.g. conditions with regards to the chip temperature 702 measured by the temperature sensor 105. A first event may be defined by the condition that the chip temperature 702 lies below T1, a second event may be defined by the condition that the chip temperature 702 lies below T2 but lies at or above T1, a third event may be defined by the condition that the chip temperature 702 lies below T3 but lies at or above T2, a fourth event may be defined by the condition that the chip temperature 702 lies below T4 but lies at or above T3, a fifth event may be defined by the condition that the chip temperature 702 lies below T5 but lies at or above T4, and a sixth event may be defined by the condition that the chip temperature 702 lies at or above T5.

Alternatively or in addition, an event may be defined by a condition which relates to a transition of the chip temperature 702 moving from a temperature below one of the thresholds T1, T2, T3, T4, T5 to a temperature at or above the one of the thresholds T1, T2, T3, T4, T5 (or vice versa). In other words, the event or the condition defining the event may relate to the crossing of one of the thresholds T1, T2, T3, T4, T5 in either direction.

Using the above states and events, the state machine 700 of FIG. 7a defines transitions 730 from a current state to a target state, subject to the detection of an event (wherein the transitions 730 are indicated by arrows). By way of example, the state machine 700 specifies a transition from the second state 722 to the first state 721, subject to the detection of the first event. Furthermore, the state machine 700 specifies a transition from the first state 721 to the second state 722, subject to the detection of the third event. Further transitions of the state machine 700 are illustrated by the arrows of FIG. 7a.

In a similar manner, FIG. 7b illustrates a state machine 710 which comprises the two states 721 and 723, a plurality of events, and a plurality of possible transitions between the states, subject to the detection of the events.

The state machines 700, 710 make use of a hysteresis for the transition between the different states. The hysteresis requires a lower chip temperature 702 for a transition from a lower level illumination state 723 to a higher level illumination state 721 than for the inverse transition. By doing this, the stability of the state machine can be improved. In particular, oscillations between states can be avoided.

In the illustrated state machines 700, 710, the transitions between the different states 721, 722, 723, 724 are abrupt, thereby causing an abrupt change in the illumination level. It may be preferable to provide a smooth transition between the plurality of different states 721, 722, 723, 724 (e.g. at a pre-determined illumination gradient), in order to mask the change between the illumination states to a user of the light bulb assembly 1. By way of example, the transition between two states may take a few seconds (e.g. 2 or more seconds).

The state machine 700, 710 which is to be used by the state control unit 144 for controlling the power converter 114, 115 may be provided to the state control unit 144 as state data 165 (also referred to as data items) from the memory unit 146. The state 721, 722, 723, 724 determined by the state control unit 144 specifies a set of parameters for the power converter 104, 115, thereby defining the amount of power 701 which is provided to the LED module 106, and thereby setting the illumination of the LED.

The use of state control using a state machine (e.g. the state machines 700, 710 of FIGS. 7a and 7b) typically outperforms the use of proportional dim down of the LED, in that state control offers a superior stability, an improved reproducibility and a better manufacturing control. Furthermore, the use of state control requires a reduced design reserve (notably with respect to heat dissipation) compared to light bulb assemblies which make use of proportional dim down.

As indicated above, the calibration unit 102 may be configured to determine an estimate of the LED temperature based on the measured chip temperature 161. For this purpose, the calibration unit 102 may make use of system data 163 (also referred to as data items) which specifies a model of the thermal transfer function of the light bulb assembly 1. As such, the aim of the calibration algorithm used by the calibration unit 102 is to generate accurate temperature values, based on a given chip temperature 161 and based on system data 163.

Figure 8:
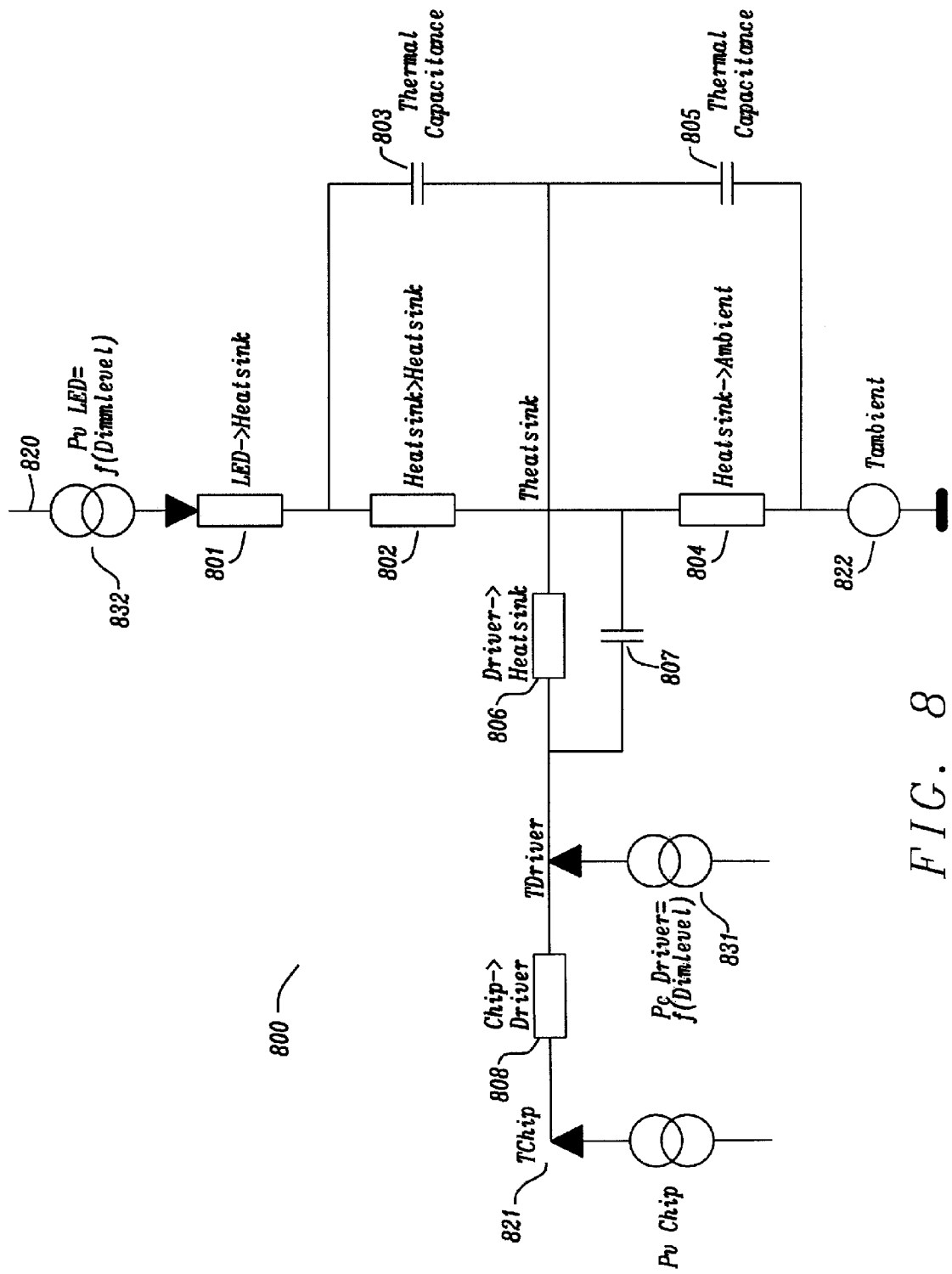
FIG. 8 shows an example network diagram for modeling the thermal characteristics of a light bulb assembly.

FIG. 8 shows an example thermal model of an LED retrofit lamp 1. The model is provided as an equivalent electric DC network. Resistors 801, 802, 804, 806, 808 represent thermal resistances (measured in K/W) or thermal conductivity, capacitors 803, 805, 807 represent thermal storage means, voltages 820, 821, 822 correspond to temperatures and currents represent heat power.

As with any linear DC network, any node in the model 800 can be calculated, if all sources and component values are known or if an equivalent number of linear independent system parameters are known. In particular, if the voltage (temperature) and current (heat power) at a particular node within the model 800 is known, the voltage (temperature) and the current (heat power) at a different node within the model 800 can be determined. In particular, a thermal transfer function between the chip temperatures 161, 821 and the LED temperature 820 can be determined based on the thermal model 800.

In the light bulb assembly 1 of FIG. 6 the chip temperature 161, 821 provided by the temperature sensor 105 is known. The resistance values and the capacitor values of the model 800 may be selected in dependence of the actual light bulb assembly 1 which is to be modeled, i.e. the resistance values and the capacitor values are dependent on the actual light bulb assembly, and may be programmed accordingly. Driver losses 831 and LED losses 832 are typically linearly dependant on the momentary dimlevel of the LED. As the dimlevel is known to the calibration algorithm (e.g. by the level data 162), any node in the model 800 can be estimated based on linear circuit analysis. The circuit could be hardwired or programmed into the calibration unit 102. The calibration algorithm may make use of more than one temperature information (e.g. from multiple temperature sensors 105). The above mentioned scheme for determining the LED temperature 820 from the measured chip temperature 821 may follow the "observer" principle in regulation theory, where the control algorithm holds information about the plant physics and simulates the plant dynamic response based on a single sensor information. Doing so, all unknown system parameters can be extracted from the simulated plant.

The detected temperature is typically a time dependant magnitude. The dynamic is given by the thermal resistances 801, 802, 804, 806, 808, as well as the thermal capacitances 803, 805, 807 of the involved thermal bodies (Heat Sinks, Components, and Filler Material). In order to detect any mechanical break or any cause of potential overheat (which might be a security issue) the change of characteristic temperatures over time may be observed (first derivative) and events may be created whenever the system exceeds critical limits in change of temperature per time unit.

In other words, the model 800 may be used as a reference model of the light bulb assembly 1. In addition, reference measurement data may be provided for different scenarios. By way of example, reference measurement data may comprise a ramp-up of the measured chip temperature 161 over time during a start-up phase of the light bulb assembly 1 (at a certain illumination level). If the actually measured ramp-up of the chip temperature 161 deviates from the reference measurement data, this may be an indication for a mechanical problem within the light bulb assembly 1. This mechanical problem may impact the heat dissipation characteristics of the light bulb assembly 1 and may therefore impact the light source 106, 6. As a reaction to the detection of such a mechanical problem, the light bulb assembly 1 may be operated in a safe operation mode (e.g. at a reduced illumination level), thereby protecting the light source 106, 6.

In the following, example aspects of the present document are listed:

Aspect 1. A controller for a driver circuit of a solid state light bulb assembly, the controller comprising:
- a digital data storage unit operable to store data items relating to operating behavior of a light bulb assembly; and
- a digital data processing unit operable to receive temperature information relating to a light bulb assembly under control, to retrieve stored data items from the data storage unit, to generate a control signal in dependence upon such received temperature information and retrieved data items, and to output such a control signal.

Aspect 2. A controller according to aspect 1, wherein the control signal is indicative of a desired output level of a light emitting device in such a light bulb assembly.

Aspect 3. A controller according to aspect 1, wherein the data processing unit is operable to generate a control signal which serves to control a pulse width modulation of a switch in such a light bulb assembly.

Aspect 4. A controller according to aspect 1, further comprising an integrated temperature sensor operable to provide the temperature information to the digital data processing unit.

Aspect 5. A controller according to aspect 1, wherein the digital data processing unit is operable to generate the control signal by reference to a look-up table stored in the digital data storage device.

Aspect 6. A controller according to aspect 1, wherein the data processing unit is operable to generate a control signal which serves to cause at least one of: a reduction of output power from a light emitting device, a reduction of output power to substantially zero from a light emitting device, inactivity of a light emitting device for a predefined period of time, and generation of an indicator signal to a user through control of a light emitting device.

Aspect 7. A controller according to aspect 1, wherein the data processing unit is operable to generate such a control signal to reduce the light output level from the light emitting device when the sensor signal indicates a temperature above a predetermined threshold level.

Aspect 8. A controller according to aspect 1, wherein the data processing unit is operable to generate such a control signal to reduce the light output level from the light emitting device substantially to zero when the sensor signal indicates a temperature above a predetermined threshold level.

Aspect 9. A controller according to aspect 1, wherein the data processing unit is operable to generate such a control signal to reduce the light output level from the light emitting device in a linear fashion when the sensor signal indicates a temperature above a predetermined threshold level.

Aspect 10. A controller according to aspect 1, wherein the data processing unit is operable to generate such a control signal to maintain the light output level from the light emitting device substantially at a predetermined level.

Aspect 11. A controller according to aspect 1, wherein the data processing unit is operable to generate such a control signal to maintain the light output level from the light emitting device within a predetermined range output levels.

Aspect 12. A controller according to aspect 1, wherein the data processing unit is operable to generate such a control signal to cause the light output level from the light emitting device to provide an indicator signal to a user.

Aspect 13. A controller according to aspect 1, wherein data processing unit is operable to receive the temperature information in the form of a digital value having a resolution of at least two bits.

Aspect 14. A controller according to aspect 1, wherein the data processing unit is operable to receive temporal information, and is operable to generate the control signal in additional dependence upon such received temporal information.

Aspect 15. A driver circuit for a solid state light bulb assembly, the driver comprising:
 a power converter operable to output a drive signal in dependence upon a received control signal; and
 a controller operable to provide a control signal to the power converter,
 wherein the controller comprises:
  a digital data storage unit operable to store data items relating to operating behavior of a light bulb assembly; and
  a digital data processing unit operable to receive temperature information relating to a light bulb assembly under control, to retrieve stored data items from the data storage unit, to generate a control signal in dependence upon such received temperature information and retrieved data items, and to output such a control signal.

Aspect 16. A driver circuit according to aspect 15, wherein the control signal is indicative of a desired output level of a light emitting device in such a light bulb assembly.

Aspect 17. A driver circuit according to aspect 15, wherein the control signal serves to control a pulse width modulation of a switch in such a light bulb assembly.

Aspect 18. A driver circuit according to aspect 15, further comprising an integrated temperature sensor operable to provide the temperature information to the digital data processing unit.

Aspect 19. A driver circuit according to aspect 15, wherein the digital data processing unit is operable to generate the control signal by reference to a look-up table stored in the digital data storage device.

Aspect 20. A driver circuit according to aspect 15, wherein the power converter circuit includes at least one switching device, and at least one inductive energy storage device, and is operable to receive an electricity supply signal from an electrical connection module, and to output an electrical drive signal to a light emitting device.

Aspect 21. A driver circuit according to aspect 15, further comprising at least one sensor device operable to provide at least one additional sensor signal for supply to the controller, and wherein the controller is operable to produce the control signal also in dependence upon such a received additional sensor signal.

Aspect 22. A driver circuit according to aspect 15, further comprising at least one further sensor device operable to provide at least one additional sensor signal for supply to the controller, and wherein the controller is operable to produce the control signals also in dependence upon received additional sensor signals, and wherein the at least one sensor device comprises at least one of a voltage sensor, a current sensor, a start-up sensor, a desired output power sensor, an infra-red sensor, a proximity sensor, and an ambient light sensor.

Aspect 23. A driver circuit according to aspect 15, wherein the data processing unit is operable to generate a control signal which serves to cause at least one of: a reduction of output power from a light emitting device, a reduction of output power to substantially zero from a light emitting device, inactivity of a light emitting device for a predefined period of time, and generation of an indicator signal to a user through control of a light emitting device.

Aspect 24. A driver circuit according to aspect 15, wherein the data processing unit is operable to generate such a control signal to reduce the light output level from the light emitting device when the sensor signal indicates a temperature above a predetermined threshold level.

Aspect 25. A driver circuit according to aspect 15, wherein the data processing unit is operable to generate such a control signal to reduce the light output level from the light emitting device substantially to zero when the sensor signal indicates a temperature above a predetermined threshold level.

Aspect 26. A driver circuit according to aspect 15, wherein the data processing unit is operable to generate such a control signal to reduce the light output level from the light emitting device in a linear fashion when the sensor signal indicates a temperature above a predetermined threshold level.

Aspect 27. A driver circuit according to aspect 15, wherein the data processing unit is operable to generate such a control signal to maintain the light output level from the light emitting device substantially at a predetermined level.

Aspect 28. A driver circuit according to aspect 15, wherein the data processing unit is operable to generate such a control signal to maintain the light output level from the light emitting device within a predetermined range output levels.

Aspect 29. A driver circuit according to aspect 15, wherein the data processing unit is operable to generate such a control signal to cause the light output level from the light emitting device to provide an indicator signal to a user.

Aspect 30. A driver circuit according to aspect 15, wherein data processing unit is operable to receive the temperature information in the form of a digital value having a resolution of at least two bits.

Aspect 31. A driver circuit according to aspect 15, wherein the data processing unit is operable to receive temporal information, and is operable to generate the control signal in additional dependence upon such received temporal information.

Aspect 32. A light bulb assembly comprising:
  a housing;
  a solid state light emitting device, located within the housing;
  an electrical connection module, attached to the housing, and adapted for connection to an electricity supply;
  a temperature sensor operable to output a sensor signal indicative of an operating temperature of a component of the assembly; and
  a driver circuit located within the housing, connected to receive an electricity supply signal from the electrical connection module, operable to supply an electrical drive signal to the light emitting device, and comprising:
    a power converter operable to output a drive signal in dependence upon a received control signal; and
    a controller operable to provide a control signal to the power converter,
  wherein the controller comprises:
    a digital data storage unit operable to store data items relating to operating behavior of a light bulb assembly; and
    a digital data processing unit operable to receive temperature information relating to a light bulb assembly under control, to retrieve stored data items from the data storage unit, to generate a control signal in dependence upon such received temperature information and retrieved data items, and to output such a control signal.

Aspect 33. An assembly according to aspect 32, wherein the control signal is indicative of a desired output level of a light emitting device in such a light bulb assembly.

Aspect 34. An assembly according to aspect 32, wherein the control signal serves to control a pulse width modulation of a switch in such a light bulb assembly.

Aspect 35. An assembly according to aspect 32, further comprising an integrated temperature sensor operable to provide the temperature information to the digital data processing unit.

Aspect 36. An assembly according to aspect 32, wherein the digital data processing unit is operable to generate the control signal by reference to a look-up table stored in the digital data storage device.

Aspect 37. An assembly according to aspect 32, wherein the power converter circuit includes at least one switching device, and at least one inductive energy storage device, and is operable to receive an electricity supply signal from an electrical connection module, and to output an electrical drive signal to a light emitting device.

Aspect 38. An assembly according to aspect 32, further comprising at least one sensor device operable to provide at least one additional sensor signal for supply to the controller, and wherein the controller is operable to produce the control signal also in dependence upon such a received additional sensor signal.

Aspect 39. An assembly according to aspect 32, further comprising at least one further sensor device operable to provide at least one additional sensor signal for supply to the controller, and wherein the controller is operable to produce the control signals also in dependence upon received additional sensor signals, and wherein the at least one sensor device comprises at least one of a voltage sensor, a current sensor, a start-up sensor, a desired output power sensor, an infra-red sensor, a proximity sensor, and an ambient light sensor.

Aspect 40. An assembly according to aspect 32, wherein the data processing unit is operable to generate a control signal which serves to cause at least one of: a reduction of output power from a light emitting device, a reduction of output power to substantially zero from a light emitting device, inactivity of a light emitting device for a predefined period of time, and generation of an indicator signal to a user through control of a light emitting device.

Aspect 41. An assembly according to aspect 32, wherein the data processing unit is operable to generate such a control signal to reduce the light output level from the light emitting device when the sensor signal indicates a temperature above a predetermined threshold level.

Aspect 42. An assembly according to aspect 32, wherein the data processing unit is operable to generate such a control signal to reduce the light output level from the light emitting device substantially to zero when the sensor signal indicates a temperature above a predetermined threshold level.

Aspect 43. An assembly according to aspect 32, wherein the data processing unit is operable to generate such a control signal to reduce the light output level from the light emitting device in a linear fashion when the sensor signal indicates a temperature above a predetermined threshold level.

Aspect 44. An assembly according to aspect 32, wherein the data processing unit is operable to generate such a control signal to maintain the light output level from the light emitting device substantially at a predetermined level.

Aspect 45. An assembly according to aspect 32, wherein the data processing unit is operable to generate such a control signal to maintain the light output level from the light emitting device within a predetermined range output levels.

Aspect 46. An assembly according to aspect 32, wherein the data processing unit is operable to generate such a control signal to cause the light output level from the light emitting device to provide an indicator signal to a user.

Aspect 47. An assembly according to aspect 32, wherein data processing unit is operable to receive the temperature information in the form of a digital value having a resolution of at least two bits.

Aspect 48. An assembly according to aspect 32, wherein the data processing unit is operable to receive temporal information, and is operable to generate the control signal in additional dependence upon such received temporal information.

What is claimed is:
1. A controller for a driver circuit of a solid state light bulb assembly; wherein the solid state light bulb assembly comprises a light source; wherein the driver circuit comprises a power converter; the controller comprising:

a data storage unit operable to store data items relating to an operating behavior of the light bulb assembly;

a temperature sensor operable to determine a chip temperature of the controller; and a data processing unit operable to receive the chip temperature, to retrieve the stored data items from the data storage unit, to generate a control signal in dependence upon the chip temperature and the retrieved data items, and to output the control signal to the power converter for operation of the light source; wherein the data processing unit comprises a calibration unit; wherein the data items comprise a default thermal model indicative of a relationship between the chip temperature and a temperature of the light source; wherein the calibration unit is operable to determine light bulb assembly specific parameters of the default thermal model during a calibration phase, thereby yielding a light bulb assembly specific thermal model; and wherein the data processing unit is operable to determine a light bulb assembly specific state machine for the operation of the light bulb assembly, based on the light bulb assembly specific thermal model.

2. The controller of claim 1, wherein the data processing unit comprises a state control unit;

the data items comprise a state machine;

the state machine comprises a plurality of states indicative of a plurality of corresponding illumination levels of the light source, and a plurality of transitions between at least some of the plurality of states; and the plurality of transitions are subject to a respective plurality of events.

3. The controller of claim 2, wherein the state control unit is operable to determine a current state of the plurality of states;

the state control unit is operable to detect an event based on the chip temperature;

the state control unit is operable to determine a target state of the plurality of states based on the state machine; and the data processing unit is operable to generate the control signal for operating the light source in accordance to the target state.

4. The controller of claim 2, wherein a state of the plurality of states is indicative of a power to be provided by the power converter to the light source; and/or a state of the plurality of states is associated with settings of the power converter; wherein the settings comprise one or more of: a duty cycle and a commutation cycle rate.

5. The controller of claim 2, wherein an event of the plurality of events is defined by one or more conditions;

the one or more conditions comprise one or more of: a condition with respect to the chip temperature; a condition with respect to a pre-determined time interval; a condition with respect to a mains supply voltage.

6. The controller of claim 2, wherein the state machine provides a hysteresis for the transition between states, such that a transition from a first state indicative of a first illumination level to a second state indicative of a second illumination level occurs subject to a first event comprising a condition that the chip temperature exceeds a second threshold; wherein the second illumination level is lower than the first illumination level, and a transition from the second state to the first state occurs subject to a second event comprising a condition that the chip temperature is below a first threshold; wherein the first threshold is lower than the second threshold.

7. The controller of claim 2, wherein the state machine, the plurality of states and/or the plurality of events depend on an operational phase of the light bulb assembly; and the operational phase comprises one or more of: a start-up phase, a steady phase at a particular illumination level.

8. The controller of claim 1, wherein the data processing unit is operable to determine a plurality of light bulb assembly specific state machines for a corresponding plurality of operational phases of the light bulb assembly.

9. The controller of claim 1, wherein the calibration unit is operable to determine a temporal evolution of the chip temperature, subject to a default state of the light source; and determine the light bulb assembly specific parameters of the default thermal model based on the determined temporal evolution of the chip temperature.

10. The controller of claim 9, wherein the data processing unit is operable to compare the temporal evolution of the chip temperature with a default temporal evolution of the light bulb assembly; and if a deviation between the temporal evolution and the default temporal evolution exceeds a pre-determined deviation threshold, generate the control signal for operating the light source in a safe operation mode with reduced illumination level.

11. The controller of claim 1, wherein the data processing unit is operable to determine an estimate of the temperature of the light source based on the chip temperature and based on the light bulb assembly specific thermal model.

12. The controller of claim 11, wherein the data processing unit is operable to determine the estimate of the temperature of the light source further based on a current through the light source and/or a voltage at the light source.

13. The controller of claim 1, wherein the chip temperature is represented as a binary value of at least 2 bits.

14. A driver circuit for a solid state light bulb assembly, the driver circuit comprising:

a power converter operable to output a drive signal to a solid state light source in dependence upon a received control signal; and a controller for the driver circuit of a solid state light bulb assembly; wherein the solid state light bulb assembly comprises a light source; wherein the driver circuit comprises a power converter; operable to provide the control signal to the power converter comprising:

a data storage unit operable to store data items relating to an operating behavior of the light bulb assembly;

a temperature sensor operable to determine a chip temperature of the controller; and a data processing unit operable to receive the chip temperature, to retrieve the stored data items from the data storage unit, to generate a control signal in dependence upon the chip temperature and the retrieved data items, and to output the control signal to the power converter for operation of the light source; wherein the data processing unit comprises a calibration unit; wherein the data items comprise a default thermal model indicative of a relationship between the chip temperature and a temperature of the light source; wherein the calibration unit is operable to determine light bulb assembly specific parameters of the default thermal model during a calibration phase, thereby yielding a light bulb assembly specific thermal model; and wherein the data processing unit is operable to determine a light bulb assembly specific state machine for the operation of the light bulb assembly, based on the light bulb assembly specific thermal model.

15. A light bulb assembly comprising:

a housing;

a solid state light emitting device, located within the housing;

an electrical connection module, attached to the housing, and adapted for connection to a mains supply; and a driver circuit, located within the housing, connected to receive an electricity supply signal from the electrical connection module, and operable to supply an electrical drive signal to the light emitting device, comprising:

a power converter operable to output a drive signal to a solid state light source in dependence upon a received control signal; and a controller for the driver circuit of a solid state light bulb assembly; wherein the solid state light bulb assembly comprises a light source; wherein the driver circuit comprises a power converter; operable to provide the control signal to the power converter comprising:

a data storage unit operable to store data items relating to an operating behavior of the light bulb assembly;

a temperature sensor operable to determine a chip temperature of the controller; and a data processing unit operable to receive the chip temperature, to retrieve the stored data items from the data storage unit, to generate a control signal in dependence upon the chip temperature and the retrieved data items, and to output the control signal to the power converter for operation of the light source; wherein the data processing unit comprises a calibration unit; wherein the data items comprise a default thermal model indicative of a relationship between the chip temperature and a temperature of the light source; wherein the calibration unit is operable to determine light bulb assembly specific parameters of the default thermal model during a calibration phase, thereby yielding a light bulb assembly specific thermal model; and wherein the data processing unit is operable to determine a light bulb assembly specific state machine for the operation of the light bulb assembly, based on the light bulb assembly specific thermal model.

* * * * *